(12) United States Patent
Oya et al.

(10) Patent No.: US 7,711,463 B2
(45) Date of Patent: May 4, 2010

(54) ELECTRIC POWER STEERING SYSTEM

(75) Inventors: Toshiaki Oya, Sakai (JP); Masahiko Sakamaki, Okazaki (JP)

(73) Assignee: JTEKT Corporation, Osaka-Shi (JP)

( * ) Notice: Subject to any disclaimer, the term of this patent is extended or adjusted under 35 U.S.C. 154(b) by 788 days.

(21) Appl. No.: 10/591,443

(22) PCT Filed: Mar. 3, 2005

(86) PCT No.: PCT/JP2005/003607
§ 371 (c)(1),
(2), (4) Date: Oct. 24, 2006

(87) PCT Pub. No.: WO2005/085041
PCT Pub. Date: Sep. 15, 2005

(65) Prior Publication Data
US 2007/0198153 A1    Aug. 23, 2007

(30) Foreign Application Priority Data
Mar. 5, 2004   (JP)  .............................. 2004-062546

(51) Int. Cl.
*B62D 6/00*  (2006.01)
(52) U.S. Cl. .............................. 701/41; 701/42; 701/44; 475/19
(58) Field of Classification Search ............. 701/41–44; 180/6.2, 6.24, 6.28, 6.44, 400, 446; 475/18–19; 477/1; 340/426.31
See application file for complete search history.

(56) References Cited

U.S. PATENT DOCUMENTS

| | | | | |
|---|---|---|---|---|
| 5,151,860 | A * | 9/1992 | Taniguchi et al. | 701/41 |
| 6,370,459 | B1 * | 4/2002 | Phillips | 701/41 |
| 7,546,896 | B2 * | 6/2009 | Furusho et al. | 180/446 |
| 2007/0205041 | A1 * | 9/2007 | Nishizaki et al. | 180/446 |

FOREIGN PATENT DOCUMENTS

| | | |
|---|---|---|
| EP | 0 943 528 A2 | 9/1999 |
| JP | 7-132839 A | 5/1995 |
| JP | 8-108857 A | 4/1996 |
| JP | 8-290778 A | 11/1996 |
| JP | 2003-170855 A | 6/2003 |
| JP | 2004-216952 A | 8/2004 |

\* cited by examiner

*Primary Examiner*—Yonel Beaulieu
(74) *Attorney, Agent, or Firm*—Birch, Stewart, Kolasch & Birch, LLP

(57) ABSTRACT

An electric power steering system includes: a band-stop filter 15a having a transfer function $G_1(s)$ for suppressing resonance, and a phase compensator 15b having a transfer function $G_2(s)$. The above function $G_1(s)$ is represented by an expression $G_1(s)=(s^2+2\zeta_{11}\omega_1+\omega_1^2)/(s^2+2\zeta_{12}\omega_1+\omega_1^2)$, where s is a Laplace operator, $\zeta_{11}$ is a damping coefficient, $\zeta_{12}$ is a damping coefficient, and $\omega_1$ is an angular frequency. On the other hand, the above function $G_2(s)$ is represented by an expression $G_2(s)=(s^2+2\zeta_{21}\omega_2+\omega_2^2)/(s^2+2\zeta_{22}\omega_2+\omega_2^2)$, where s is a Laplace operator, $\zeta_{21}$ is a damping coefficient, $\zeta_{22}$ is a damping coefficient, and $\omega_1$ is an angular frequency. Furthermore, the above damping coefficients $\zeta_{21}$, $\zeta_{22}$ satisfy an expression $\zeta_{21} 24\ \zeta_{22} \geq 1$. Thus, a filter such as a phase compensator may attain a design freedom while preventing the increase of arithmetic load, whereby both the suppression of resonance and a good assist response in a normal steering speed region, for example, may be achieved.

3 Claims, 7 Drawing Sheets

ELECTRIC POWER STEERING SYSTEM

TECHNICAL FIELD

The present invention relates to an electric power steering system.

BACKGROUND ART

The electric power steering system is designed to apply a steering assist torque to a steering mechanism by driving an electric motor based on a steering torque applied by a driver to a handle (steering wheel). More specifically, the electric power steering system provides a current control (feedback control) such that a target current may flow through the electric motor for generating the steering assist torque, the target current defined based on a steering torque detected by a torque sensor.

The conventional electric power steering systems include one which is provided with a stability compensator at a next portion of the torque sensor in order to improve the stability of a control system. Such an electric power steering system is disclosed in, for example, Japanese Unexamined Patent Publication No. H8-290778. The stability compensator of the conventional system has a characteristic expression $G(s) = (s^2 + a_1 s + a_2)/(s^2 + b_2 s + b_2)$, where s denotes a Laplace operator and $a_1$, $a_2$, $a_3$, $a_4$ denote parameters decided by resonant frequencies of a resonant system.

In Japanese Unexamined Patent Publication No. 2004-216952, the present applicant has also proposed an electric power steering system which includes phase compensating means of the same type as a band-stop filter having a transfer function $Gc(s)$ in order to serve a dual purpose of ensuring the stability as the control system and improving response. The above transfer function $Gc(s)$ is represented by an expression $Gc(s) = (s^2 + 2\zeta_2 + 2\omega_2 s + \omega_2^2)/(s^2 + 2\zeta_1 \omega_1 s + \omega_1^2)$, where $\zeta_1$ denotes a compensated damping coefficient; $\zeta_2$ denotes a damping coefficient of a compensated system; $\omega_1$ denotes a compensated natural angular frequency; and $\omega_2$ denotes a natural angular frequency of the compensated system. The transfer function $Gc(s)$ is set to a value such as to reduce or negate a peak of a gain characteristic of an open-loop transfer function for torque of the electric power steering system, the peak appearing based on natural vibrations of a mechanical system and a counter-electromotive force of the motor.

For example, a Bode diagram of the above phase compensating means is shown in FIG. 7. As apparent from a phase characteristic indicated by a solid line in FIG. 7, the above phase compensating means is capable of enhancing the stability of the system because the phase compensating means is adapted for phase advance in a frequency region higher than 20 Hz where the electric power steering system is decreased in stability margin due to the decline of the phase characteristic thereof.

The phase compensating means represented by the transfer function $Gc(s)$ is of the same type as the band-stop filter. As seen from a gain characteristic indicated by the solid line in FIG. 7, therefore, the phase compensating means is capable of suppressing resonance (resonant frequencies: 10 to 30 Hz; in proximity of 'A' in FIG. 7) occurring in the system.

However, if the phase compensating means is excessively enhanced in the effect to suppress the resonance, the phase compensating means is decreased in gain in a normal steering speed region (frequency region in proximity of 'B' in FIG. 7) and also suffers an increased response lag in providing the assist (steering assist). Thus, steering feeling is adversely affected.

Specifically, the following problem occurs if the phase compensating means has an increased gain at the resonant frequencies on the negative-sign side in order to suppress the resonance. That is, the gain assumes negative values not only in proximity of the resonant frequencies but also in a broad frequency region about the resonant frequencies (a dot-dash gain characteristic curve in FIG. 7). What is more, the phase advance is increased in a frequency region higher than the resonant frequencies (in proximity of 'A' in FIG. 7), whereas the phase lag is increased in a frequency region (in proximity of 'B' in FIG. 7) lower than the resonant frequencies (a dot-dash phase characteristic curve in FIG. 7).

In order to minimize the response lag in the normal steering speed region B and to decrease the gain at the resonant frequencies, it may be contemplated to define the transfer function $Gc(s)$ of the phase compensating means to satisfy $\zeta_2 < \zeta_1 < 1$.

However, this approach cannot exclude floating-point arithmetic which poses a great arithmetic load on a controller (microcomputer). Hence, this approach is impracticable in the electric power steering system required of high-speed processing.

As described above, the transfer function $Gc(s)$ may sometimes be unable to serve a dual purpose of suppressing the resonance and providing a good assist response in the normal steering speed region. Furthermore, an attempt to attain another desired characteristic encounters difficulties of reducing the arithmetic load and providing design freedom.

It is therefore an object of the invention to provide the freedom in designing a filter such as a compensator and also to obviate the increase of arithmetic load, thereby serving a dual purpose of, for example, suppressing the resonance and improving the assist response in the normal steering speed region.

DISCLOSURE OF THE INVENTION

In an electric power steering system including a torque control system for generating a steering assist torque based on a detected steering torque, the electric power steering system according to the invention for achieving the above object further comprises a filter portion for improving a phase characteristic or a gain characteristic of the torque control system, wherein the filter portion is constituted as a multiple-step filter including a first filter having a transfer function $G_1(s)$ for suppressing resonance and a second filter having a transfer function $G_2(s)$, wherein the transfer function $G_1(s)$ is represented by the following expression (1-1), $$G_1(s) = (s^2 + 2\zeta_{11}\omega_1 + \omega_1^2)/(s^2 + 2\zeta_{12}\omega_1 + \omega_1^2) \quad (1\text{-}1),$$

where s: a Laplace operator, $\zeta_{11}$: a damping coefficient, $\zeta_{12}$: a damping coefficient and $\omega_1$: an angular frequency, wherein the transfer function $G_2(s)$ is represented by the following expression (2-1), $$G_2(s) = (s^2 + 2\zeta_{21}\omega_2 + \omega_2^2)/(s^2 + 2\zeta_{22}\omega_2 + \omega_2^2) \quad (2\text{-}1),$$

where s: a Laplace operator, $\zeta_{21}$: a damping coefficient, $\zeta_{22}$: a damping coefficient and $\omega_2$: an angular frequency, and wherein the damping coefficients $\zeta_{21}$, $\zeta_{22}$ satisfy the following expression (2-2), $$\zeta_{21} \geq \zeta_{22} \geq 1 \quad (2\text{-}2).$$

According to the invention, the filter portion is constituted as the multiple-step filter including the first filter having the transfer function $G_1(s)$ and the second filter having the transfer function $G_2(s)$, so that the filter portion as a whole has a characteristic combining those of $G_1(s)$ and $G_2(s)$.

If the filter is so designed that $G_2(s)$ acts to improve $G_1(s)$, a desired characteristic may be obtained relatively easily as compared with filter designing using $G_1(s)$ alone. Furthermore, the individual filters are of the second order such as to reduce the arithmetic load, while practically providing as much design freedom as a fourth-order filter.

Hence, the invention provides easy reduction of phase lag in a relatively low frequency region, as the normal steering speed region, without increasing gain at the resonant frequencies to be cut.

The above angular frequencies $\omega_1$, $\omega_2$ may preferably be defined as $\omega_1=\omega_2$, or may also be defined as $\omega_1 \neq \omega_2$. In the case of $\omega_1=\omega_2$, the transfer functions $G_1(s)$ and $G_2(s)$ present symmetrical characteristics, thus offering relatively easy filter designing. In the case of $\omega_1 \neq \omega_2$, the design freedom is enhanced further.

BEST MODE FOR CARRYING OUT THE INVENTION

A preferred embodiment of the invention will hereinbelow be described with reference to the accompanying drawings.

Figure 1:
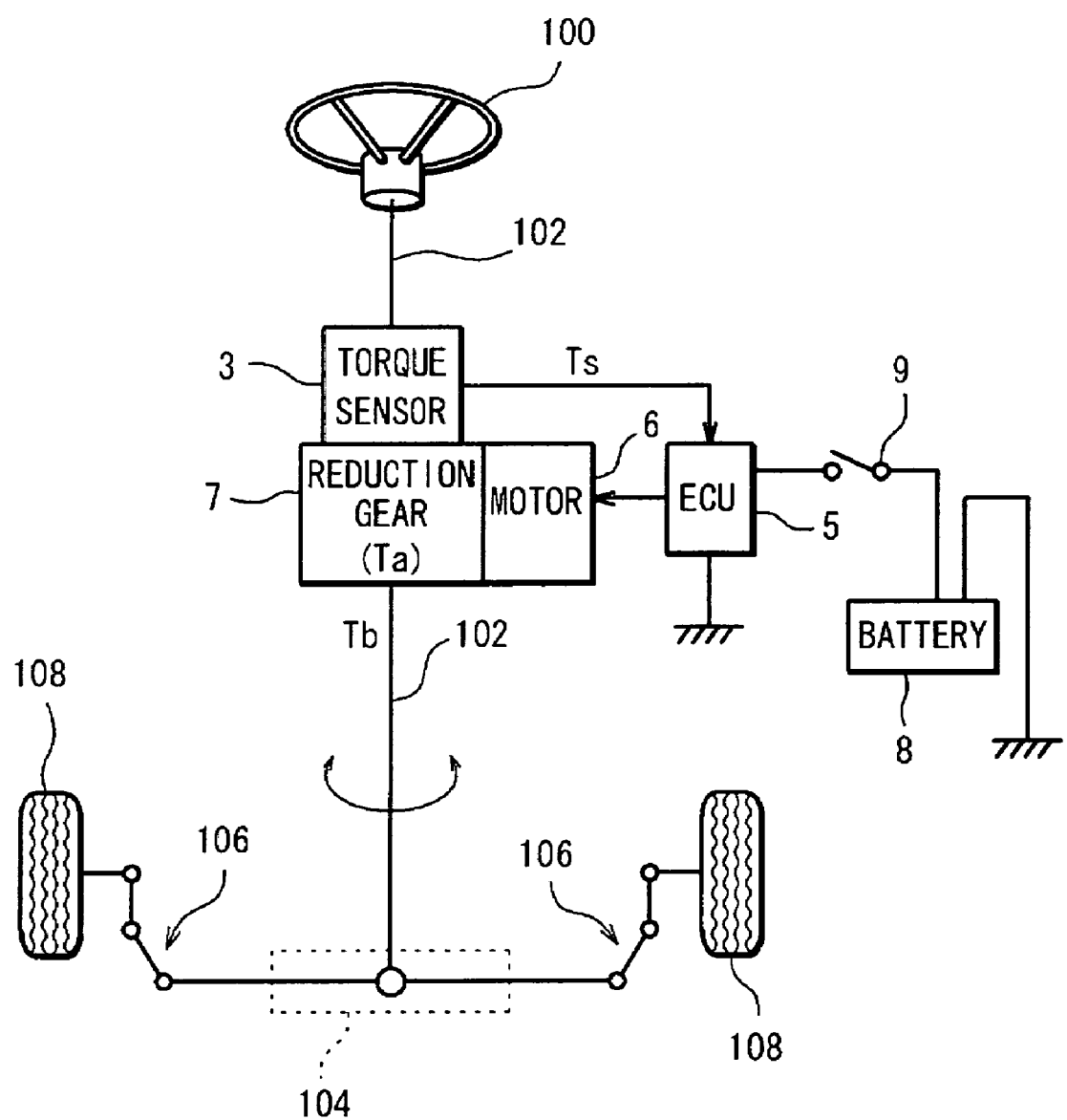
FIG. 1 is a schematic diagram showing an arrangement of an electric power steering system along with a vehicle arrangement associated therewith.

FIG. 1 shows an arrangement of an electric power steering system along with a vehicle arrangement associated therewith. The electric power steering system includes: a steering shaft 102 having one end thereof secured to a handle 100 (steering wheel) as a steering member; and a rack and pinion mechanism 104 connected to the other end of the steering shaft 102.

When the steering shaft 102 is rotated, the rotation thereof is converted into a reciprocal motion of a rack shaft by means of the rack and pinion mechanism 104. Opposite ends of the rack shaft are coupled with road wheels 108 via coupling members 106 which each include a tie rod and a knuckle arm. Thus, the directions of the road wheels 108 are changed according to the reciprocal motion of the rack shaft.

The electric power steering system further includes: a torque sensor 3 for detecting a steering torque applied to the steering shaft 102 by operating the handle 100; an electric motor 6 (brushless motor) for generating a steering assist torque; a reduction gear 7 for transmitting the steering assist torque, generated by the motor 6, to the steering shaft 102; and an electronic control unit (ECU) 5 powered by an onboard battery 8 via a switch 9 for drivably controlling the motor 6 based on sensor signals from the torque sensor 3 and the like.

When a driver operates the handle 100 of a vehicle equipped with such an electric power steering system, a steering torque associated with the handling operation is detected by the torque sensor 3. Based on a detected value of the steering torque Ts, a vehicle speed and the like, the ECU 5 drives the motor 6 which, in turn, generates the steering assist torque. The steering assist torque is applied to the steering shaft 102 via the reduction gear 7 whereby load on the driver operating the handle is reduced. Specifically, a sum of the steering torque Ts applied by the handling operation and the steering assist torque Ta generated by the motor 6 is applied to the steering shaft 102 as an output torque Tb, whereby the vehicle is steered.

Figure 2:
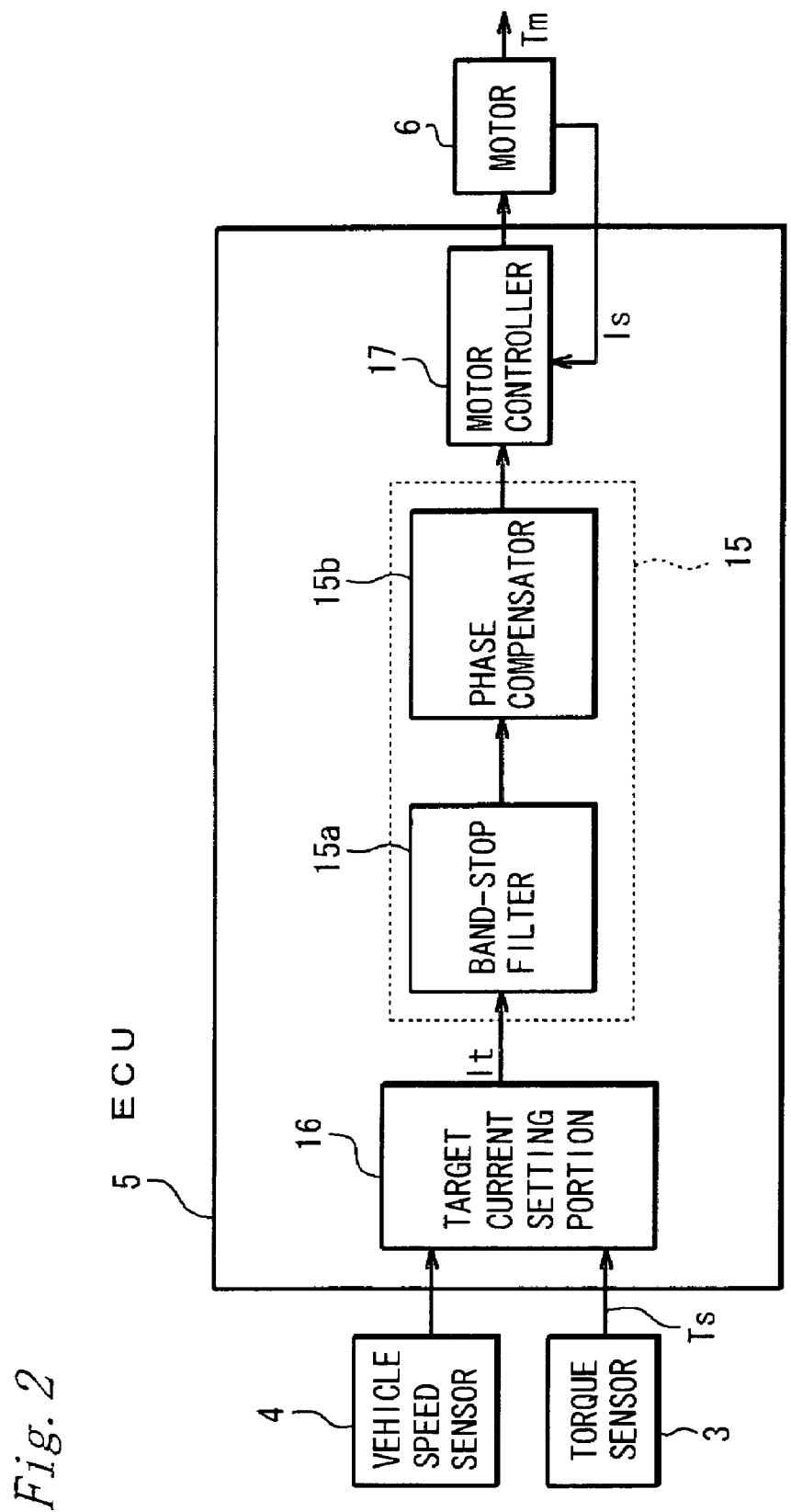
FIG. 2 is a block diagram showing an arrangement of a principal part of the electric power steering system.

FIG. 2 is a block diagram showing an arrangement of principal parts of the electric power steering system, the principal parts arranged around the ECU 5 as the controller. The ECU 5 is supplied with output signals from the torque sensor 3 for detecting the steering torque applied to the handle 100 and from a vehicle speed sensor 4 for detecting a vehicle speed.

The ECU 5 is constituted to include a microcomputer executing programs, thereby practically possessing plural function processors. Thus the ECU constitutes a torque control system for providing a torque control of the steering system as a control target.

The plural function processors include a filter portion 15 responsible for a filtering process as well as a target current setting portion 16 for setting a target current based on the torque signal Ts and a vehicle speed signal outputted from the vehicle speed sensor 4; and a motor controller 17 for providing feedback control of the electric motor 6 based on the target current set by the target current setting portion 16.

The torque sensor 3 detects the steering torque Ts applied by operating the handle 100. Specifically, a torsion bar is disposed in the steering shaft 102 as interposed between a handle-side portion of the steering shaft 102 and a portion of the steering shaft 102, the latter portion applied with the steering assist torque Ta via the reduction gear 7. The torque sensor 3 senses a quantity of torsion of the torsion bar, thereby detecting the steering torque Ts. A value of the steering torque Ts thus detected is outputted from the torque sensor 3 as a steering torque detection signal (hereinafter, also represented by the symbol "Ts"), which is inputted to the target current setting portion 16 in the ECU 5.

Based on the steering torque detection signal Ts and the vehicle speed signal from the vehicle speed sensor 4, the target current setting portion 16 calculates a target value of current to be supplied to the motor 6 and outputs the calculated value as a target current value It.

The filter portion 15 performs the filtering process on the target current value It so as to apply the filtered target current value to the motor controller 17.

The motor controller 17 provides a current control such that a value Is of current actually flowing through the motor 6 may coincide with the target current value It. The current control may be exemplified by a proportional-plus-integral control wherein such a voltage command value as to cancel a difference between the target current value and the actual current value Is is calculated, the command value representing a voltage to be applied to the motor 6. The motor controller 17 applies a voltage to the motor 6 according to the voltage command value.

The motor 6 generates a torque Tm, as the steering assist force corresponding to a current flow therethrough caused by the applied voltage. The torque Tm, as the steering assist torque Ta, is transmitted to the steering shaft 102 via the reduction gear 7.

The filter portion 15 is constituted as a resonance eliminating (suppressing) filter for eliminating or suppressing the resonance of the system. The resonance eliminating filter portion 15 is constituted as a two-step filter which includes: a band-stop filer 15a as a first filter; and a phase compensator 15b as a second filter.

A transfer function $G_1(s)$ of the band-stop filter 15a is represented by the following expression (1-1):

$$G_1(s)=(s^2+2\zeta_{11}\omega_1+\omega_1^2)/(s^2+2\zeta_{12}\omega_1+\omega_1^2) \quad (1\text{-}1)$$

where s: a Laplace operator, $\zeta_{11}$: a damping coefficient, $\zeta_{12}$: a damping coefficient, and $\omega_1$: an angular frequency.

In the above expression (1-1), the above parameters $\zeta_{11}$, $\zeta_{12}$ satisfy the following expressions (1-2), (1-3) in order to suppress the resonance during the torque control in the electric power steering system:

$$0<\zeta_{11}\leq 1 \quad (1\text{-}2)$$

$$\zeta_{12}\geq 1 \quad (1\text{-}3)$$

A transfer function $G_2(s)$ of the above phase compensator 15b is of the same type as the transfer function $G_1(s)$ of the band-stop filter 15a and is represented by the following expression (2-1):

$$G_2(s)=(s^2+2\zeta_{21}\omega_2+\omega_2^2)/(s^2+2\zeta_{22}\omega_2+\omega_2^2) \quad (2\text{-}1)$$

where s: a Laplace operator, $\zeta_{21}$: a damping coefficient, $\zeta_{22}$: a damping coefficient, and $\omega_1$: an angular frequency.

In the above expression (2-1), the above parameters $\zeta_{21}$, $\zeta_{22}$ satisfy the following expression (2-2) in order to decrease phase lag in a normal steering speed region:

$$\zeta_{21}\geq\zeta_{22}\geq 1 \quad (2\text{-}2)$$

It is more preferred that the above parameters $\zeta_{21}$, $\zeta_{22}$ satisfy the following expression (2-3):

$$\zeta_{21}>\zeta_{22}>1 \quad (2\text{-}3)$$

Figure 3:
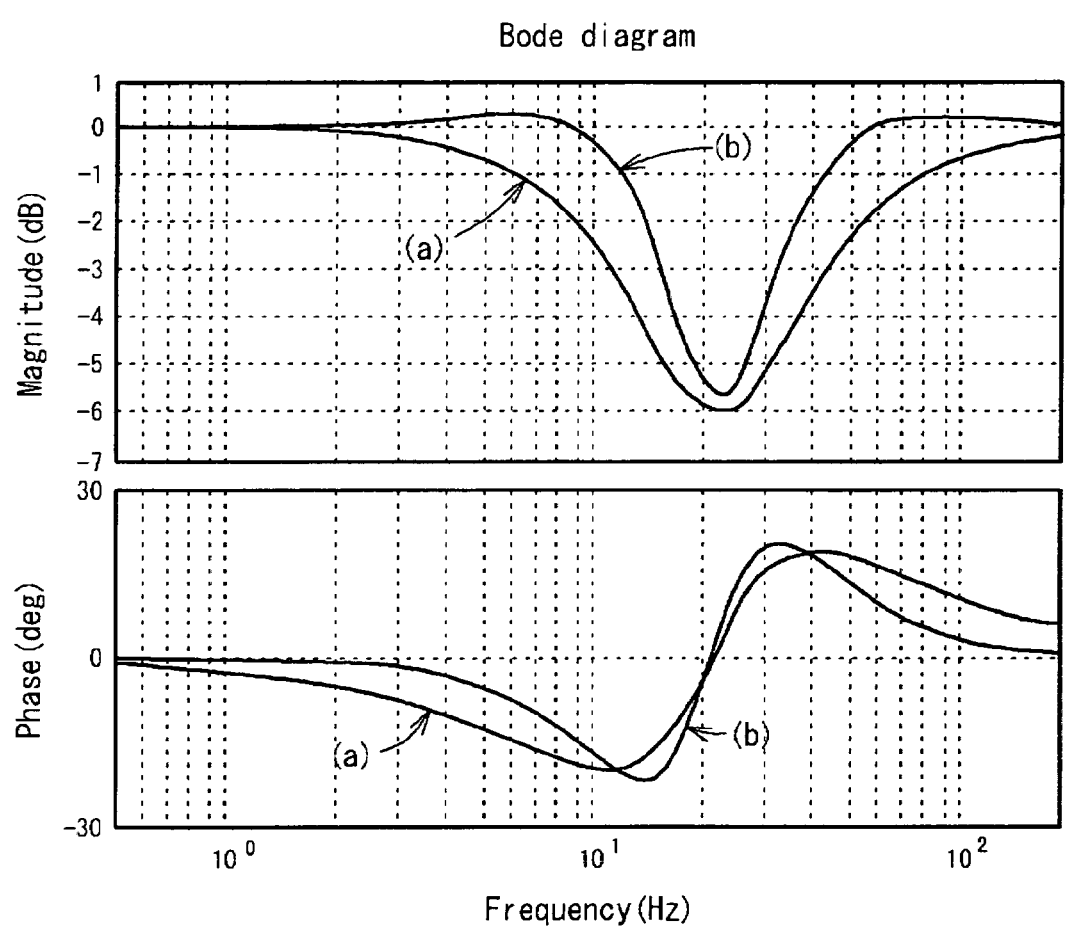
FIG. 3 is a Bode diagram showing characteristics of a single band-stop filter and those of a filter portion of the invention.

FIG. 3 illustrates a Bode diagram (curves (a) in FIG. 3) of a single phase compensator of the band-stop filter type as a comparative example, and a Bode diagram (curves (b) in FIG. 3) of the filter portion 15 of the invention which is constituted as the combination of the band-stop filer 15a and the phase compensator 15b.

FIG. 3 indicates that as compared with the case where the band-stop filter is used alone, the combined use of the band-stop filter 15a and the phase compensator 15b is more effective to decrease the phase lag in a relatively low frequency region (in proximity of 10 to 30 Hz) as the normal steering speed region, without increasing gain at resonant frequencies (in proximity of 10 to 30 Hz) to be cut. Furthermore, the combined use of the band-stop filter 15a and the phase compensator 15b is adapted to prevent the gain decrease in the low frequency region.

Thus, the use of the resonance eliminating filter portion 15 achieves more preferred characteristics than the use of the band-stop filter alone.

Figure 4:
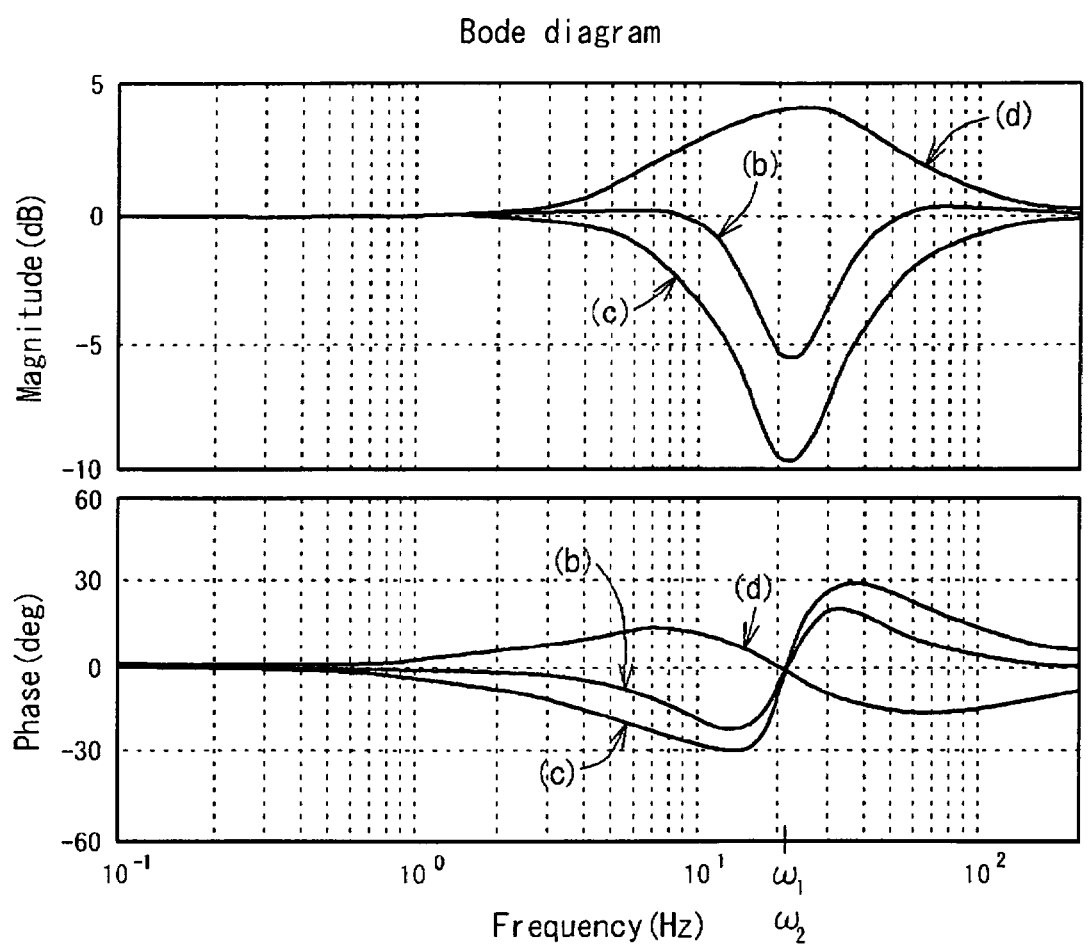
FIG. 4 is a Bode diagram showing characteristics of a resonance eliminating filter and those of components of the resonance eliminating filter.

FIG. 4 is a Bode diagram illustrating a concept of the resonance eliminating filter portion 15 constituted as the combination of the band-stop filter 15a and the phase compensator 15b. FIG. 4 illustrates a Bode diagram (curves (c) in FIG. 4) of the band-stop filter 15a (transfer function $G_1(s)$) and a Bode diagram (curves (d) in FIG. 4) of the phase compensator 15b (transfer function $G_2(s)$; $\zeta_{21}\geq\zeta_{22}\geq 1$).

The band-stop filter 15a is characterized by enhancing stability by decreasing the gain at the resonant frequencies while advancing the phase at frequencies of 20 Hz or more. As used alone, on the other hand, the band-stop filter 15a causes the gain decrease and the phase lag in the low frequency region (in proximity of 1 to 3 Hz) as the normal steering speed region.

The phase compensator 15b is designed to have the transfer function defined as $\zeta_{21}\geq\zeta_{22}\geq 1$, so that the phase compensator exhibits a low gain peak but has a broader frequency region involving the phase advance and the phase lag, as compared with the band-stop filter 15a. Thus, the phase compensator acts to improve a phase characteristic at frequencies away from the resonant frequencies. Specifically, the characteristic (d) advances the phase in the low frequency region where the phase is lagged by the characteristic (c). However, the characteristic (d) does not exhibit such a great gain peak at the resonant frequencies as to negate the gain suppressing effect of the characteristic (c). This makes it possible to improve response.

In order to obtain a desired characteristic of the resonance eliminating filter portion 15, the characteristics of the phase compensator 15b may be properly defined while taking the characteristics (curves (c) in FIG. 4) of the band-stop filter 15a into consideration. This leads to an easy design of the resonance eliminating filter portion 15.

As indicated by the curves (b) in FIG. 4 (the same as those (b) in FIG. 3), the whole body of the resonance eliminating filter portion 15 (transfer function $G_1(s)G_2(s)$) combining the band-stop filter 15a and the phase compensator 15b is adapted to provide a good assist response by decreasing the phase lag in the normal steering speed region while suppressing the resonance. As to the gain characteristic, the resonance eliminating filter portion 15 is capable of negating the gain decrease in the low frequency region.

Furthermore, because of $\zeta_{21}\geq\zeta_{22}\geq 1$, the resonance eliminating filter portion does not involve floating-point arithmetic, thus remarkably reducing arithmetic load on the ECU 5.

What is more, if the phase compensator 15b is added to the band-stop filter 15a, it is easy to design the phase compensator because the phase compensator 15b has the second-order transfer function similarly to the band-stop filter 15a. Since the second-order phase compensator is added to the second-order band-stop filter 15a, the resonance eliminating filter portion 15 practically has a fourth-order transfer function. In the case of the fourth-order filter implemented by combining the second-order filter with the second-order compensator, it is easier to design such a filter than to design a fourth-order filter from the beginning.

The characteristics (c) and (d) of the band-stop filter 15a and the phase compensator 15b shown in FIG. 4 are defined to satisfy $\omega_1=\omega_2$ so that these characteristics are substantially symmetrical with respect to 0[dB] or 0[deg] (although, they have different magnitudes). Therefore, the characteristic of the resonance eliminating filter portion 15 as a whole is in linear or point symmetry with respect to $\omega_1$, $\omega_2$.

Alternatively, $\omega_1$ and $\omega_2$ may be set to different values depending upon a desired characteristic of the resonance eliminating filter portion 15. In this case, the resonance eliminating filter portion 15 may be increased in the degree of characteristic freedom by setting $\omega_1$, $\omega_2$ at different values.

EXAMPLE

Transfer Function P(s) of Control Target (Second-Order Lag System):

$$P(s)=(\omega_1^2/(s^2+2\zeta_2\omega_1+\omega_1^2))\cdot(\omega_2/(s+\omega_2))$$

Figure 5:
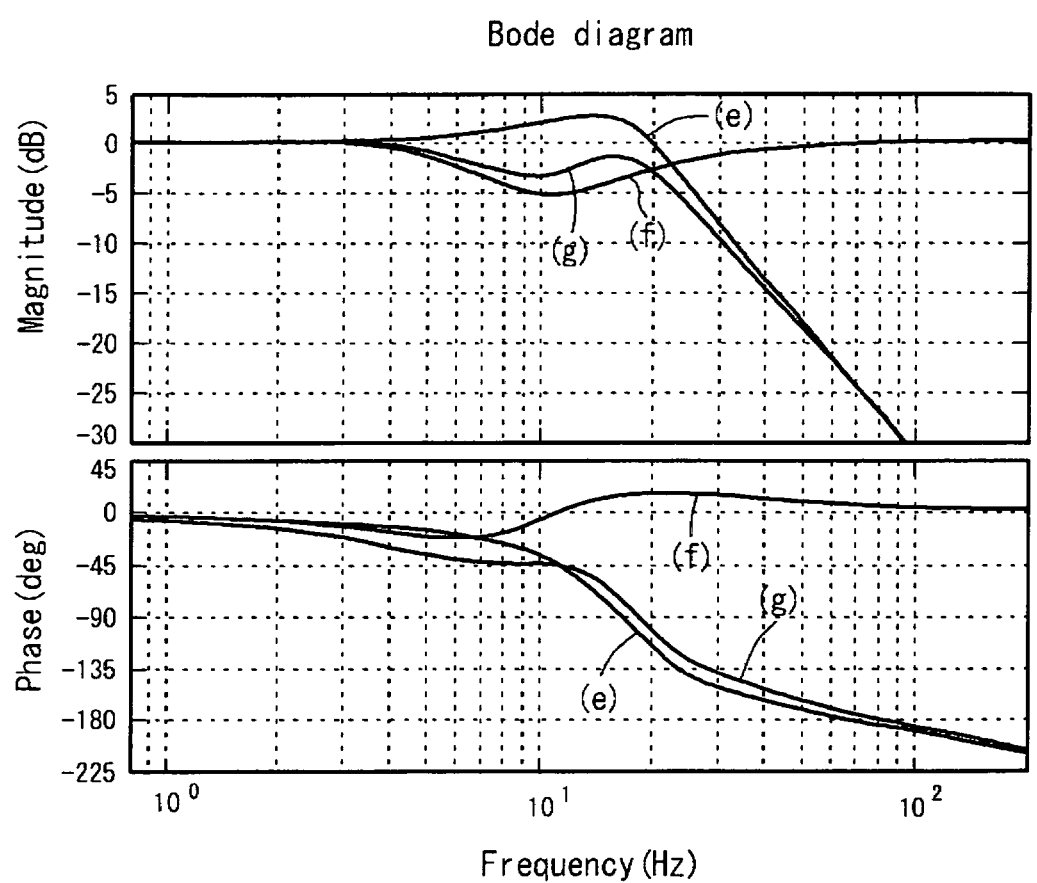
FIG. 5 is a Bode diagram showing characteristics of a control target, those of the filter portion of the invention and those of the control target subjected to the filter portion.

Provided that $\omega_1=16.5\times2\pi$, $\omega_2=300\times2\pi$ and $\zeta=0.4$, a Bode diagram of the control target exhibits curves (e) shown in FIG. 5. In the control target, a resonance peak appears at 16.5 Hz, whereas the phase lag occurs at high frequencies.

The control target is subjected to the resonance eliminating filter portion 15 (transfer function $G_1(s)\cdot G_2(s)$), where $\omega_1=10\times2\pi$, $\zeta_{11}=0.5$, $\zeta_{12}=1.1$, and $\omega_2=6\times2\pi$, $\zeta_{21}=1.3$, $\zeta_{22}=1.05$.

In this case, a Bode diagram of the resonance eliminating filter portion 15 exhibits curves (f) shown in FIG. 5. On the other hand, the control target subjected to the resonance eliminating filter portion 15 exhibits characteristics represented by curves (g) in FIG. 5.

Figure 6:
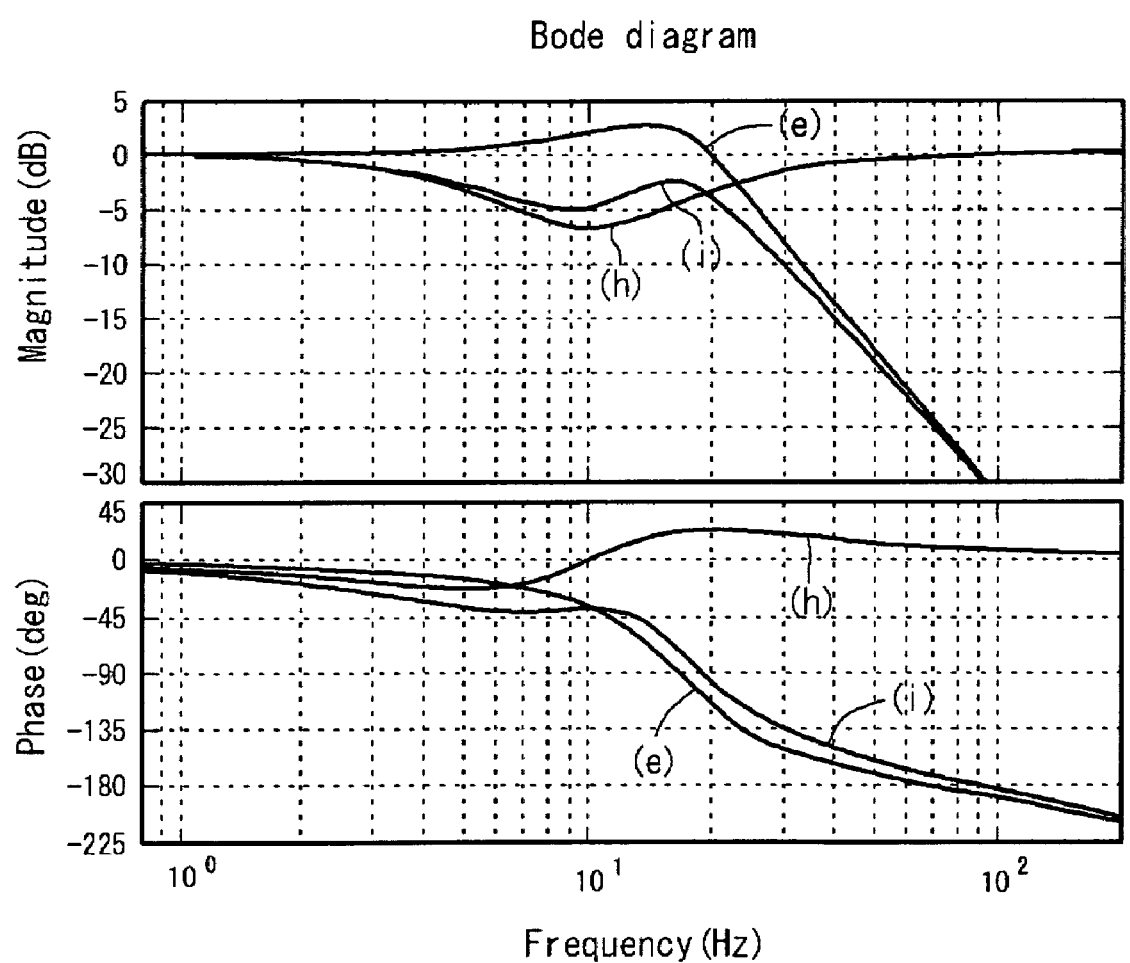
FIG. 6 is a Bode diagram showing the characteristics of the control target, those of a single body of the band-stop filter and those of the control target subjected to the band-stop filter.
Figure 7:
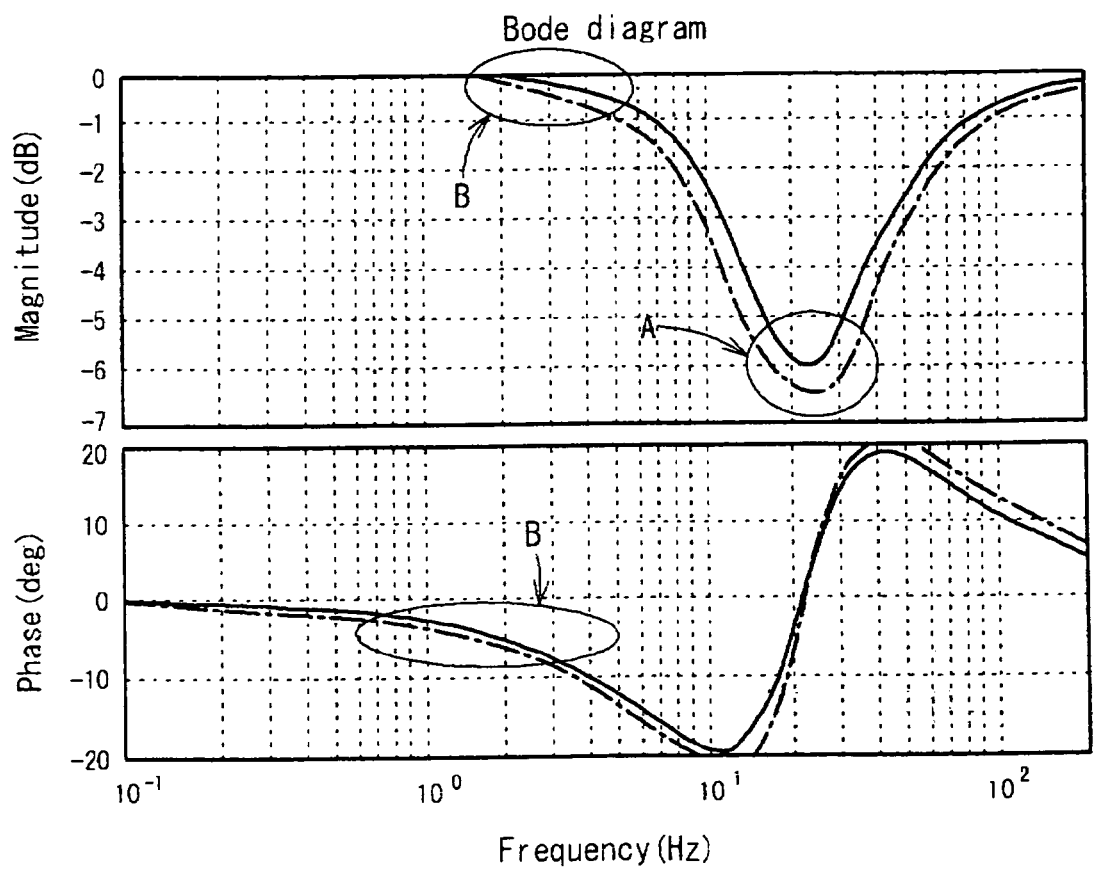
FIG. 7 is a Bode diagram showing characteristics of conventional phase compensating means.

FIG. 6 shows a Bode diagram of a comparative example wherein the control target (transfer function P(s)) is subjected to the band-stop filter 15*a* alone. In FIG. 6, curves (e) represent the characteristics of the control target, curves (h) represent the characteristics of a single body of the band-stop filter 15*a*, and curves (i) represent the characteristics of the control target subjected to the bad-stop filter 15*a*.

According to comparison between the curves (g) in FIG. 5 which represent the characteristics of the example and the curves (i) in FIG. 6 which represent the characteristics of the comparative example, both the example and the comparative example accomplish the resonance suppression. However, it is indicated that the characteristics (g) in FIG. 5 are more improved than the characteristics (i) in FIG. 6 in both of the gain performance and the phase performance in the low frequency region as the normal steering speed region.

The invention claimed is:

1. An electric power steering system including a torque control system for generating a steering assist torque based on a detected steering torque, the system further comprising a filter portion for improving a phase characteristic or a gain characteristic of the torque control system, wherein the filter portion is constituted as a multiple-step filter including a first filter having a transfer function $G_1(s)$ for suppressing resonance and a second filter having a transfer function $G_2(s)$, wherein the transfer function $G_1(s)$ is represented by the following expression:

$$G_1(s)=(s^2+2\zeta_{11}\omega_1+\omega_1^2)/(s^2+2\zeta_{12}\omega_1+\omega_1^2),$$

where s is a Laplace operator, $\zeta_{11}$ is a damping coefficient, $\zeta_{12}$ is a damping coefficient, and $\omega_1$ is an angular frequency, wherein the transfer function $G_2(s)$ is represented by the following expression:

$$G_2(s)=(s^2+2\zeta_{21}\omega_2+\omega_2^2)/(s^2+2\zeta_{22}\omega_2+\omega_2^2),$$

where s is a Laplace operator, $\zeta_{21}$ damping coefficient, $\zeta_{22}$ is a damping coefficient, and $\omega_2$ is an angular frequency, and wherein the damping coefficients $\zeta_{21}$, $\zeta_{22}$ satisfy the following expression:

$$\zeta_{21}\geq\zeta_{22}\geq1.$$

2. The electric power steering system according to claim 1, wherein the angular frequencies $\omega_1$, $\omega_2$ satisfy the following expression:

$$\omega_1=\omega_2.$$

3. The electric power steering system according to claim 1, wherein the angular frequencies $\omega_1$, $\omega_2$ satisfy the following expression:

$$\omega_1\neq\omega_2.$$

* * * * *